(No Model.)  2 Sheets—Sheet 1.

E. E. GOLD.
STEAM TRAP.

No. 472,116.  Patented Apr. 5, 1892.

WITNESSES:
C. E. Ashley
H. W. Lloyd

INVENTOR:
Edward E. Gold,
By his Attorneys,
Arthur C. Fraser &c.

(No Model.) 2 Sheets—Sheet 2.

E. E. GOLD.
STEAM TRAP.

No. 472,116. Patented Apr. 5, 1892.

WITNESSES:
C. E. Ashley
H. W. Lloyd.

INVENTOR:
Edward E. Gold,
By his Attorneys,
Arthur C. Fraser & Co.

UNITED STATES PATENT OFFICE.

EDWARD E. GOLD, OF NEW YORK, N. Y.

STEAM-TRAP.

SPECIFICATION forming part of Letters Patent No. 472,116, dated April 5, 1892.

Application filed July 6, 1891. Serial No. 398,529. (No model.)

*To all whom it may concern:*

Be it known that I, EDWARD E. GOLD, a citizen of the United States, residing in the city, county, and State of New York, have invented certain new and useful Improvements in Steam-Traps, of which the following is a specification.

This invention relates to traps for discharging water of condensation from steam-pipes, applicable, chiefly, to the steam-heating pipes of railway-cars. The trap is what may be called a "dynamic steam-trap," consisting, essentially, of a valve having a spring tending to press it open and closing with the steam-pressure, so that as long as the pressure is turned on it remains closed, but upon the release of the pressure it opens and drains off the accumulated water of condensation.

My present invention provides an improved construction of trap of this character, which is designed most particularly for application to the couplings for connecting together the steam-heating pipes of railway-cars.

According to my present invention I provide a protector attached to the coupling-head and inclosing the projecting portions of the trap, so that they are shielded against injury. I also provide the trap with a strainer for preventing access of dirt to the valve, and I construct this strainer to project with its perforated portions in the path of the steam flowing through the coupling-head, so that the current of steam shall impinge upon the openings and circulate through them, thereby tending to keep them clear or unobstructed.

My invention also includes some improvements in the construction of the trap itself.

Figure 1:
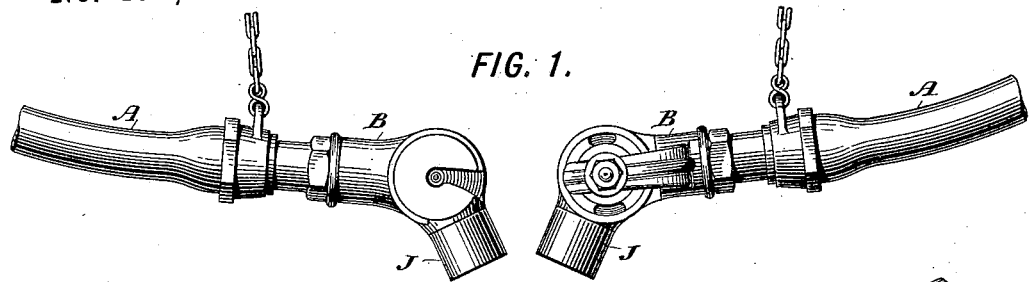
Figure 2:
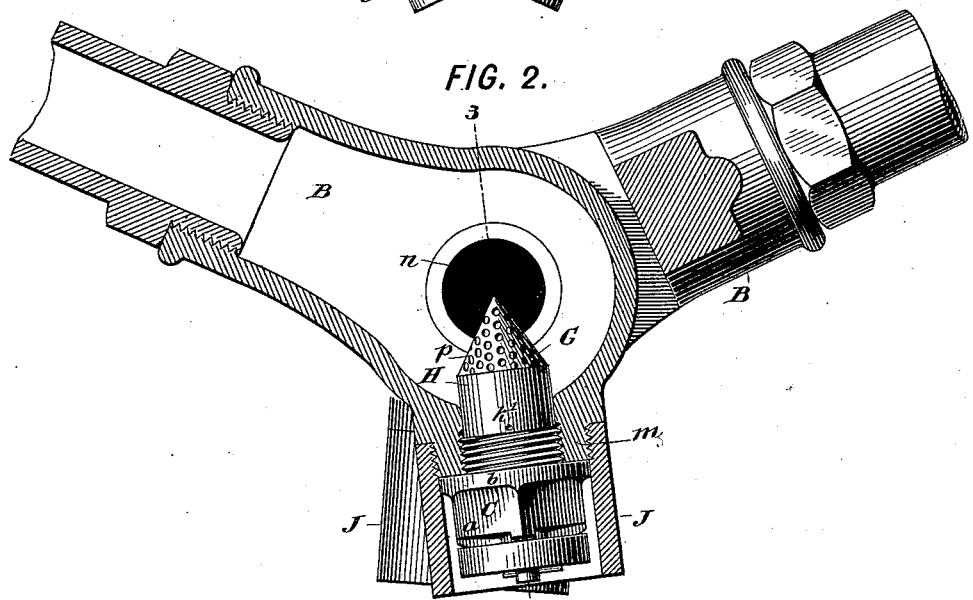
Figure 3:
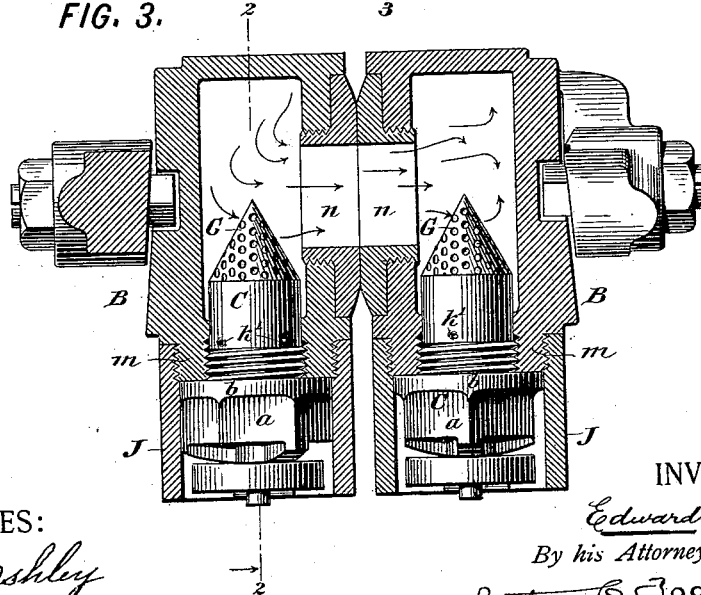
Figure 4:
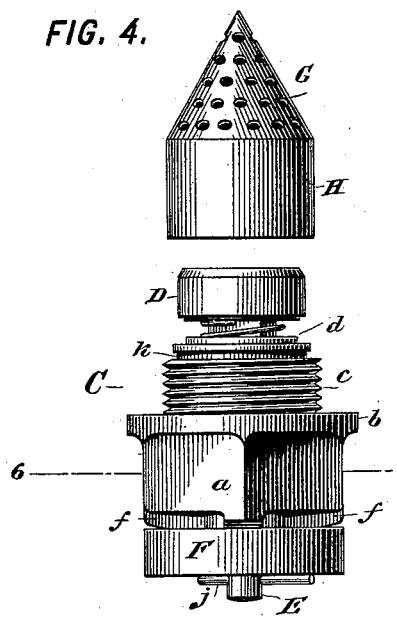
Figure 5:
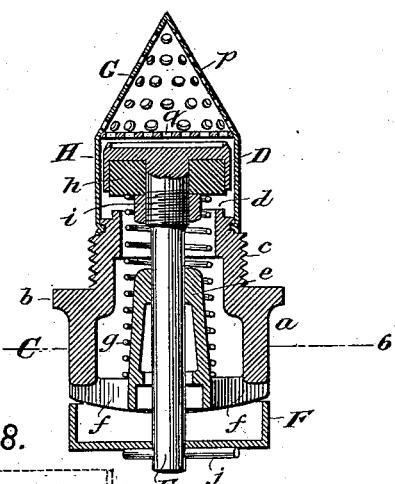
Figure 6:
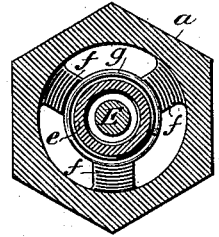
Figure 8:
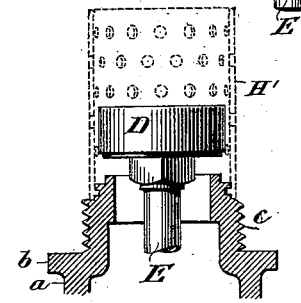
Figure 9:
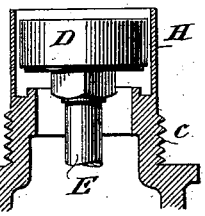
Figure 7:
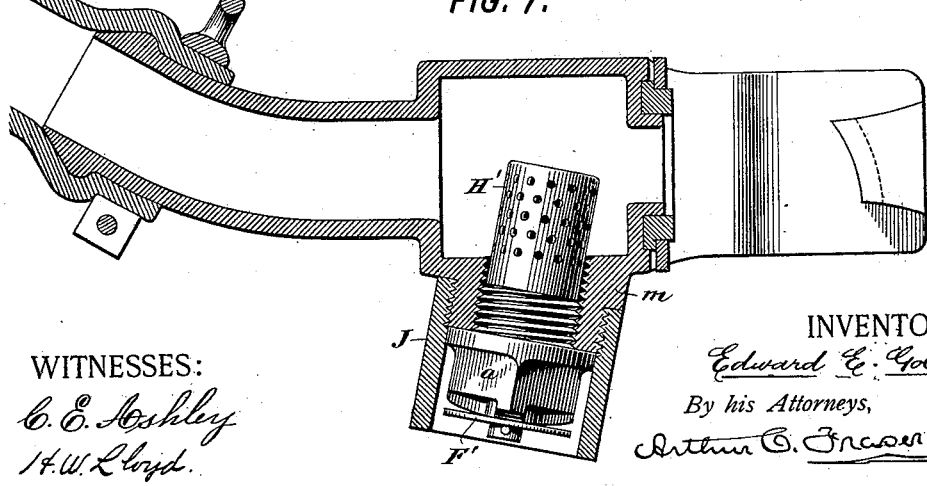

Figure 1 of the accompanying drawings is a side elevation showing a pair of Gold couplers provided with shielded traps according to my present invention. Fig. 2 is a vertical longitudinal section through one of the coupling-heads in the axis of the trap in the plane of the line 2 2 in Fig. 3. Fig. 3 is a transverse vertical section through the two coupling-heads approximately in the plane of the line 3 3 in Fig. 2. In Figs. 2 and 3 the trap is shown in elevation. Fig. 4 is an elevation of the trap on a larger scale, showing its strainer lifted off. Fig. 5 is a vertical midsection of the trap on the same scale as Fig. 4. Fig. 6 is a transverse section thereof on the lines 6 6 in Figs. 4 and 5. Fig. 7 is a longitudinal section of another construction of coupling, showing my improved trap applied thereto. Fig. 8 is a fragmentary section of the upper portion of the trap shown in Fig. 7. Fig. 9 is a fragmentary section of another modification.

The trap-valve is shown open in Figs. 2, 4, 5, and 7, and closed in Fig. 3.

Let A A designate the terminal sections of hose applied to two adjoining railway-cars, and B B the hose-couplers attached to the ends of the sections of hose. The couplers shown in Figs. 1 to 3 are of the construction well known in the art as the "Gold" coupler, having two bowl-like heads, each having a locking-arm to embrace the other and adapted on being brought together and oscillated the one on the other to have their seats, which are formed in their laterally-abutting faces, forced into intimate contact by the action of wedging-inclines on the outer faces of the bowls engaging the locking-arms. The construction of the couplings, however, is unessential to my present invention.

Let C designate my improved trap as a whole. This trap operates on the same principle as that claimed in my patent, No. 398,719, dated February 26, 1889, and is an improvement on the construction there shown.

The trap is constructed with a shell or body portion $a$, preferably formed with a flange $b$ and with a polygonal exterior beneath this flange, so that it may be grasped by a wrench to screw the threaded portion or shank $c$ into the socket which is to receive it. This shell is tubular, and at its upper end is formed a seat $d$, against the upper side of which a disk valve D is adapted to seat itself. Within the shell is formed a tubular boss $e$, connected at the lower end by arms or spokes $f$ with the body or exterior portion of the shell. The valve D is provided with a stem E, projecting downwardly from it and guided by the tubular boss $e$. A spiral spring $g$ is arranged within the shell, fitting around the boss $e$ and its upper end taking under the valve D, so that it exerts an upward tension against the valve, tending continually to lift it off its seat to the position shown in Figs. 4 and 5. The upward movement of the valve may be limited by any suitable stop. The disk valve D is preferably formed as a hollow shell, as shown in Fig. 5, within which is seated a disk or cushion $h$, of any suitable material, preferably of what is known in the art as "composition" or "Jenkins's composition." This disk may be held in place by screwing a nut $i$ onto the threaded stem E, as shown in Fig. 5.

Beneath the shell $a$ is mounted a cup F, consisting of a disk with an upturned peripheral flange, and through the center of which passes a stem E, a pin or cotter $j$ being passed through it to hold the cup on. The cup serves to partially close and conceal the lower opening in the shell and by its flange striking the ribs $f$ when drawn up by the action of the spring $g$ serves as a stop to limit the upward movement of the valve. In place of this cup a plain disk might be used, as shown at F' in Fig. 7.

Over the valve is placed a strainer G, of any suitable foraminous or intersticial material adapted to strain the water of condensation during its passage to the valve and arrest any impurities that might clog the valve or tend to make it leak by getting between it and the seat. In the preferred construction this strainer is made of two screens $p$ and $q$, of which the outer one $p$ is of conical form and the inner one $q$ is made flat and crosses the base of the outer one. This strainer G is mounted on top of a tubular casing or chamber H, which when in place, as shown in Fig. 5, incloses the valve D, leaving only a contracted annular space between for the passage of the steam or water. This chamber serves an important purpose in insuring the proper closing of the valve when steam-pressure is turned on. At such time the steam enters freely through the strainer G and flows downward in an annular stream through the chamber H and between it and the periphery of the valve D and passes out through the seat $d$ and through the interior of the shell $a$. In thus flowing downwardly the stream of steam not only impinges upon the top of the valve D, but also by flowing around the valve in a somewhat choked stream in necessarily close proximity to the valve the stream or current of steam tends to carry the valve downward with it, and thereby hastens and insures the seating of the valve. By this means a stronger uplifting-spring $g$ may be employed than would otherwise be used, so that when the steam-pressure is turned off the valve is enabled to lift against a greater superincumbent pressure of accumulated condensation-water.

The strainer G and chamber H may be constructed as one part, if preferred, as shown in Figs. 7 and 8, where the chamber (here lettered H') is made of perforated sheet metal in tubular form, the perforations extending down as low as the valve-seat in order that all the condensed water may be drawn off down to the lowest portion of the hollow in the coupling-head. In case the chamber H is thus perforated the steam is admitted both downwardly and laterally, and to the extent of the lateral perforations the strong downwardly-flowing annular current of steam around the valve is reduced; but nevertheless there will be some current in this direction, which will tend to carry the valve down with it. In either construction the chamber H may be attached in any suitable way to the top of the valve-shell $a$, a convenient means being by forming a groove $k$, Fig. 4, and indenting the sheet metal of the chamber H into the screw at intervals, as shown at $k'$ in Figs. 2 and 3; or the chamber H may be united to the shell $a$ in any other suitable way, as by soldering it, or it might even be made integral with the shell $a$, as shown in Fig. 9. This figure shows no strainer; but a strainer might be applied on top of the projecting chamber H, if desired.

The trap C, constructed in the manner described, is applied to the coupling-head B in any suitable manner, preferably by being screwed into a threaded boss $m$, formed therein in the manner shown in Figs. 2 and 3, so that the flange $b$ abuts against the end of this boss and makes a tight joint. This leaves all that portion of the trap beneath this flange projecting downwardly below the coupling-head, and as these parts are necessarily somewhat delicately constructed, so that they have not sufficient strength to safely withstand the blows to which a coupling-head is liable, I provide for protecting them by applying a tubular shield J to the coupling-head in such manner as to project down around and inclose the projecting portion of the trap, and of such thickness as to afford ample strength. This shield J is preferably applied by screwing it onto the threaded exterior of the boss $m$.

When the trap is applied to the coupling-head, its strainer G projects into the latter sufficiently far to stand in the steam-passage, where it receives the impingement of the current of steam whenever the latter is flowing rapidly through the pipes, so that the steam flows through the perforations of the strainer, or some of them, and by so doing acts to blow out any sediment or clogging particles, and thereby tends to keep the strainer clear. This is an important and highly advantageous feature of my invention.

As applied to a Gold coupling the strainer G projects into line with the communicating seats or passages $n\ n$ of the two coupling-heads, as shown best in Fig. 3. Fig. 7 shows the application of this feature of my invention to a coupler of a different type, the couplers shown being known as "direct-port" couplings, wherein the seating-faces are arranged to meet in a plane perpendicular to the general direction of the hose. As such couplers couple by the hooking together of locking projections having wedging faces, the two coupling-heads being inclined upwardly to couple them, it is necessary in applying the trap to carry it somewhat back and to tilt it at an angle, as shown, in order that it shall not be in the way in coupling together the two heads.

My invention is applicable, also, to other styles or types of couplers.

I claim as my invention the following-defined novel features or combinations, substantially as hereinbefore specified, namely:

1. The combination, with a steam coupling-head, of a trap-valve applied thereto to drain off the water of condensation therefrom and an open-ended tubular shield applied to the head to inclose the projecting portion of the trap and protect it from injury, whereby a blow is received by said shield and transmitted to the head without straining the trap.

2. The combination, with a steam coupling-head having an opening at its lower side through a threaded boss $m$, of a trap-valve applied to said opening to drain off the water of condensation therethrough and projecting beyond the spring, and an open-ended tubular shield inclosing the projecting portion of the trap to protect it from injury and screwed onto said threaded boss.

3. The combination, with a steam coupling-head, of a trap-valve applied thereto to drain off the water of condensation therefrom, said valve having a strainer within the coupling-head arranged in the steam-passage, whereby the current of steam shall impinge upon said strainer and circulate through the perforations thereof, thereby tending to keep them clear of obstructions.

4. A dynamic steam-trap consisting of a shell formed with a seat, a valve over said seat, a spring tending to press up and open said valve, and a tubular chamber extending above the seat and closely surrounding said valve, whereby escaping steam flows downwardly within said chamber, and thereby tends to carry the valve down and seat it.

5. A dynamic steam-trap consisting of a shell formed with a seat at its upper end, a valve over said seat, having a stem descending through said shell, a spring tending to press up and open said valve, and a tubular chamber extending above the seat and closely surrounding said valve and provided with a strainer, whereby the steam entering through said strainer and flowing downwardly around the valve within said chamber tends to carry the valve down and close it.

6. A dynamic steam-trap consisting of a shell formed with a seat at its upper end, a valve over said seat, having a stem descending through said shell, a spring tending to press up and open said valve, and a tubular chamber and strainer adapted to inclose said valve and fitted to said shell around its seat.

7. A dynamic steam-trap consisting of a shell formed with a seat at its upper end, a valve over said seat, having a stem descending through said shell, a spring tending to press up and open said valve, and a strainer for said valve, consisting of two screens $p$ and $q$, substantially as and for the purpose set forth.

In witness whereof I have hereunto signed my name in the presence of two subscribing witnesses.

EDWARD E. GOLD.

Witnesses:
GEORGE H. FRASER,
CHARLES K. FRASER.